(12) United States Patent
Olbricht

(10) Patent No.: US 7,353,373 B2
(45) Date of Patent: Apr. 1, 2008

(54) INTELLIGENT PRINTER INSTALLATION

(75) Inventor: Eric Olbricht, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 384 days.

(21) Appl. No.: 10/404,955

(22) Filed: Mar. 31, 2003

(65) Prior Publication Data

US 2004/0193745 A1 Sep. 30, 2004

(51) Int. Cl.
*G06F 15/177* (2006.01)

(52) U.S. Cl. .......................... 713/1; 709/223; 709/224; 709/225; 709/226

(58) Field of Classification Search .................... 713/1, 713/2; 709/223–226
See application file for complete search history.

(56) References Cited

U.S. PATENT DOCUMENTS

| | | | |
|---|---|---|---|
| 5,129,639 A | | 7/1992 | DeHority |
| 5,481,742 A | | 1/1996 | Worley et al. |
| 5,768,583 A | | 6/1998 | Orzol et al. |
| 5,852,744 A | * | 12/1998 | Agatone et al. ............... 710/17 |
| 5,960,167 A | | 9/1999 | Roberts et al. |
| 6,076,106 A | * | 6/2000 | Hamner et al. ............. 709/223 |
| 6,301,012 B1 | | 10/2001 | White et al. |
| 6,463,426 B1 | * | 10/2002 | Lipson et al. ................... 707/3 |
| 6,789,111 B1 | * | 9/2004 | Brockway et al. ........... 709/222 |
| 6,829,059 B1 | * | 12/2004 | Kimura ...................... 358/1.15 |
| 6,920,506 B2 | * | 7/2005 | Barnard et al. ............. 709/245 |
| 2001/0046065 A1 | * | 11/2001 | Furukawa et al. .......... 358/1.15 |
| 2002/0049837 A1 | * | 4/2002 | Kato .......................... 709/223 |
| 2002/0069239 A1 | * | 6/2002 | Katada et al. .............. 709/202 |
| 2002/0083431 A1 | * | 6/2002 | Machida ...................... 717/174 |
| 2002/0196451 A1 | * | 12/2002 | Schlonski et al. ............ 358/1.1 |
| 2003/0005100 A1 | * | 1/2003 | Barnard et al. ............. 709/223 |
| 2003/0174360 A1 | * | 9/2003 | Ohshima .................... 358/1.15 |
| 2004/0019671 A1 | * | 1/2004 | Metz .......................... 709/223 |
| 2004/0061909 A1 | * | 4/2004 | Ferlitsch et al. ............ 358/474 |
| 2004/0190052 A1 | * | 9/2004 | Sando ....................... 358/1.15 |

* cited by examiner

*Primary Examiner*—A. Elamin
(74) *Attorney, Agent, or Firm*—Chernoff, Vilhauer, McClung & Stenzel

(57) ABSTRACT

An improved system for installing a printer on a computer or a network of computers. The disclosed system is capable of installing and configuring a printer on a computer and a network to which the computer is connected. The disclosed system allows a user to specify an arbitrary and intuitive alphanumeric name for the printer so that it may be easily identified among many printers when it is used. The disclosed system allows a user to specify a descriptive location of the printer so that it may be easily located among many printers after it prints a print job.

44 Claims, 14 Drawing Sheets

INTELLIGENT PRINTER INSTALLATION

BACKGROUND OF THE INVENTION

The present invention relates to an improved system for installing a printer on a computer or a network of computers.

Existing systems for installing a printer on a computer or a network of computers require the completion of several steps to properly configure the printer for use. Because each of these steps requires the entry of specific, critical configuration parameters, the person installing the printer must have detailed knowledge of the printer, the computer network, and the printing environment provided by the operating system.

For example, when installing a printer within a Windows network environment, many existing systems of installing the printer use vendor-provided utilities to configure the printer while Microsoft-provided utilities configure the client computer and/or the server. With respect to printer configuration, many vendor-provided utilities may require that the Printer IP address be specified, along with the Printer Gateway and, if DNS is supported in the network environment, the Printer DNS name.

With respect to server configuration, Microsoft Windows allows the printer to be configured in one of two configurations. In the first configuration, the printer may be connected for network, or queue-based printing through a server accessible through one or more remote computers, such as a client. Each remote computer sends all print data to the server and receives status information from the server. The remote computer never communicates directly with the device and is unaware of where or how the printer is connected to the server. The server is configured to share the printer and performs all data spooling for the printer. Microsoft provides software in all versions of Windows to configure both the remote computer and the server for network printing. During the configuration process, the remote computer must receive information as to the Windows printer name, the Windows print driver and the print queue location while the printing device must receive information as to the printer IP address, the printer netmask, the printer gateway, and the printer DNS name. In addition, the server must receive information as to the printer IP address, the printer DNS name, the Windows printer name, the Windows print driver, any alternate OS print drivers and the print queue location.

In an alternate configuration, the printer may be configured for remote printing—a special class of local printing where the printer is connected through a network. A computer performs its own data spooling and communicates directly with the printer for status and data output. If more than one computer is connected to the printer for remote printing, the printer will prioritize print job requests. The software component used to communicate directly with the device is called a port monitor. Port monitors are specific to the device that they communicate with, and are usually supplied by the device manufacturer. When configuring a printer for remote printing, the computer must receive information as to the printer IP address, the printer DNS name, the Windows printer name and the Windows print driver. If the computer acts as a server for one or more other remote computers, the computer must also receive information as to any alternate OS print drivers and the print queue location.

When installing and configuring a new printer, the person installing the printer may not know or have ready access to the specific configuration parameters necessary to configure the printer, the computer, and the server, if any. If a printer is connected to a server for use by one or more remote computers, an additional problem often occurs because the remote computer identifies the printer by either the printer's IP address or DNS name, or some other alphanumeric string that has little meaning to the user. Thus, if more than one printer is connected to the server, the user may not be able to easily identify which printer has received and printed the desired print job.

Some existing systems for printer configuration have attempted to address these problems. One such existing system, for example, configures the printer and the computer from the same installation tool using a novice-friendly wizard that presents simple questions to the person installing the printer using non-technical terms. This installation tool, though, does not support server usage of the client computer. If the client computer is to be used as a server, the person installing the printer must therefore input all needed parameters. In addition, this system still identifies the printer using only a non-intuitive alphanumeric string, making it difficult for a user to identify which computer is receiving a print job.

What is needed, then, is a printer installation tool that is targeted towards non-technical users, uses non-technical terms, supports configuration of the client computer as a server, and identifies the installed computer by an identifier that allows a user to intuitively identify that particular printer, even where multiple printers are accessible through a network.

DETAILED DESCRIPTION OF THE INVENTION

Figure 1:
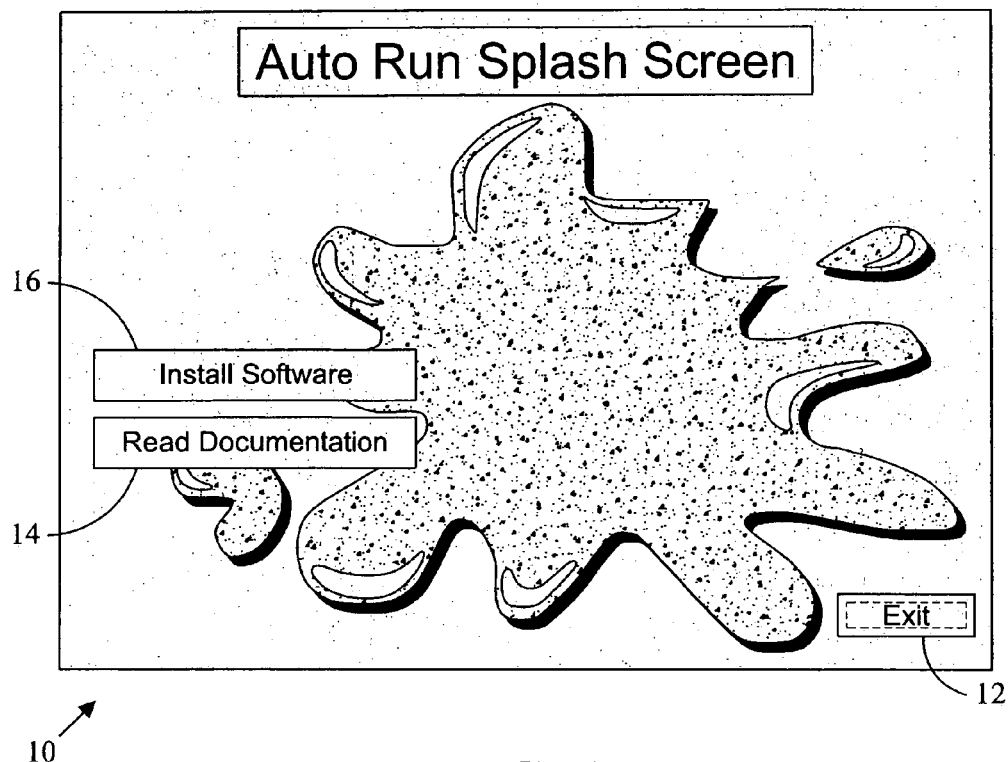
FIG. 1 is an exemplary display that may initiate any one of the disclosed printer installation tools.
Figure 2:
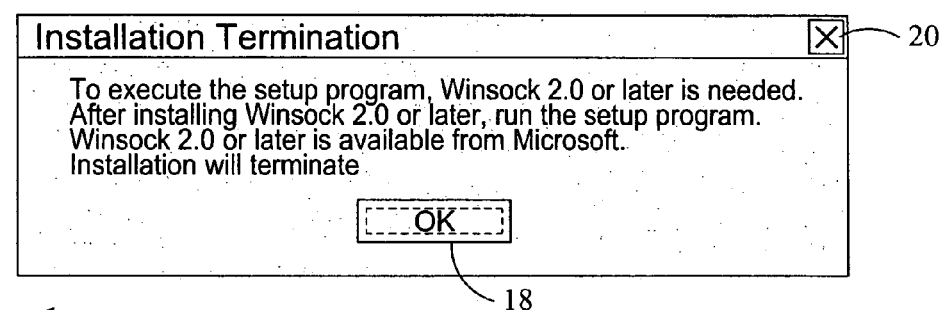
FIG. 2 is an exemplary "Installation Termination" display that may appear in response to the selection of the "Install Software" in the splash screen of FIG. 1 where the disclosed installation tool does not detect Winsock 2.0 on a client computer with a Windows 95 operating system.

The present invention overcomes the aforementioned disadvantages of existing installation tools by providing a novice-friendly printer installation tool that configures both the client computer and the printer, and is capable of configuring a client computer for use as a network server. In addition, the disclosed printer installation tool allows a user to select a unique and intuitive identifier for the printer being installed, which will be then be associated with the installed printer by the disclosed installation tool so that it may be quickly identified by a person using the client computer to request a print job by the installed printer.

The disclosed installation tool may be an embedded firmware implementation of a network print server and its associated client software. The disclosed installation tool may be initiated through a CD ROM, the web (both internet and intranet), or from Windows DOS mode with no user interface, for example. The disclosed installation tool may allow a user, who may be either a system administrator or a novice, to install the printer in a small or enterprise network for direct (Peer-to-Peer) printing. The disclosed installation tool preferably supports printer installation and client computer and optionally server configuration in the Win 95/98/ME and WIN NT4.0, WIN 2K and Win XP platforms, for example.

One preferred disclosed printer installation tool is responsible for the installation of the printer drivers and associated software components for the client computer and any applicable server. The installation application discovers all the available print devices accessible to the client computer, either locally or through a shared network and presents a list of those discovered devices to the user, who can select the interested one for installation. In the discovery process the disclosed printer installation tool discovers one or more of the following: the WINS/DNS name, IP address, Location of the printer, Device type/information, MAC address, Installation flag (indicate whether the printer is previously installed in the network or not), Sharp-Net-Mask, Sharp-Net-Gateway, DHCP ON/OFF printer parameters through SLP discovery. The user has the option of configuring printer parameter like the WINS/DNS name of the printer, location of the printer, Installation flag, Sharp-Net-Gateway, Sharp-Net-Mask, DHCP ON/OFF. The user-configured printer parameters are pushed back from the client computer and/or the server through the SNMP protocol operation. Also, the disclosed printer installation tool may add registry entries and store the discovered devices in a disk file.

The disclosed invention may be quickly understood in reference to a series of user interface (UI) screens, shown in FIGS. 1-21, that guide a user though one embodiment of a disclosed printer installation tool. It should be understood that the UI screens depicted in FIGS. 1-21 are illustrative only, and that other embodiments of the disclosed printer installation tool may present different UI screens to a user. The UI screens depicted in FIGS. 1-21 are preferably 332×218 Dialog Based Units (DBU) or 498×354 pixels screen units size. Furthermore, unless explicitly stated, the UI scope will always be focused on the button that will lead the user though the default path of the dialogs so that the user can install the device with a minimum number of hits of the Enter key.

FIG. 1 shows an exemplary splash screen 10 that may appear when a user inserts a CD that contains an executable printer installation tool into a CD-ROM drive. Preferably, the printer installation tool will automatically run upon insertion of the CD-ROM, however, the installation tool should also preferably be executable from a DOS command, or by manually selecting the installation tool through the client computer's operating system. Alternatively, the splash screen 10 may appear after the installation tool is downloaded from the web and the user executes a "setup.exe" file, or other executable file that initiates the disclosed printer installation tool.

The splash screen 10 presents a user with the options of either exiting the program, reading documentation associated with the disclosed printer installation tool, or beginning the installation process. The user may exit the program by selecting the "Exit" button 12, after which the installation tool will terminate operation. The user may choose to view any associated documentation by selecting the "Read Documentation" button 14. Associated documentation may include a user's manual, a networking tutorial, and/or an installation tutorial presents the installation procedure to the user and suggests responses to any foreseen problems that may occur during the installation process.

Some embodiments of the disclosed printer installation tool may require the presence of a Winsock 2.0 file to install a printer on a computer that operates in a Windows 95 environment. If so, upon a user's selection of the "Install Software" button 16, the printer installation tool may check whether the operating system on the client computer is Windows 95, and if so, check to see whether Winsock 2.0 is installed in the Windows directory of the client computer. If it is not, the "Installation Termination" screen 19 of FIG. 2 may be displayed and operation of the installation tool terminated after the user clicks the "OK" button or the "exit window" button 20.

Furthermore, some embodiments of the printer installation tool may require that the user have administrative rights to install a printer, as is common within Windows NT 4.0, Windows 2000 or Windows XP, for example. If so, the printer installation tool will check to see whether the user has such rights, and if not, display a termination screen (not shown) informing the user of the his or her lack of authority to install the printer.

Figure 3:
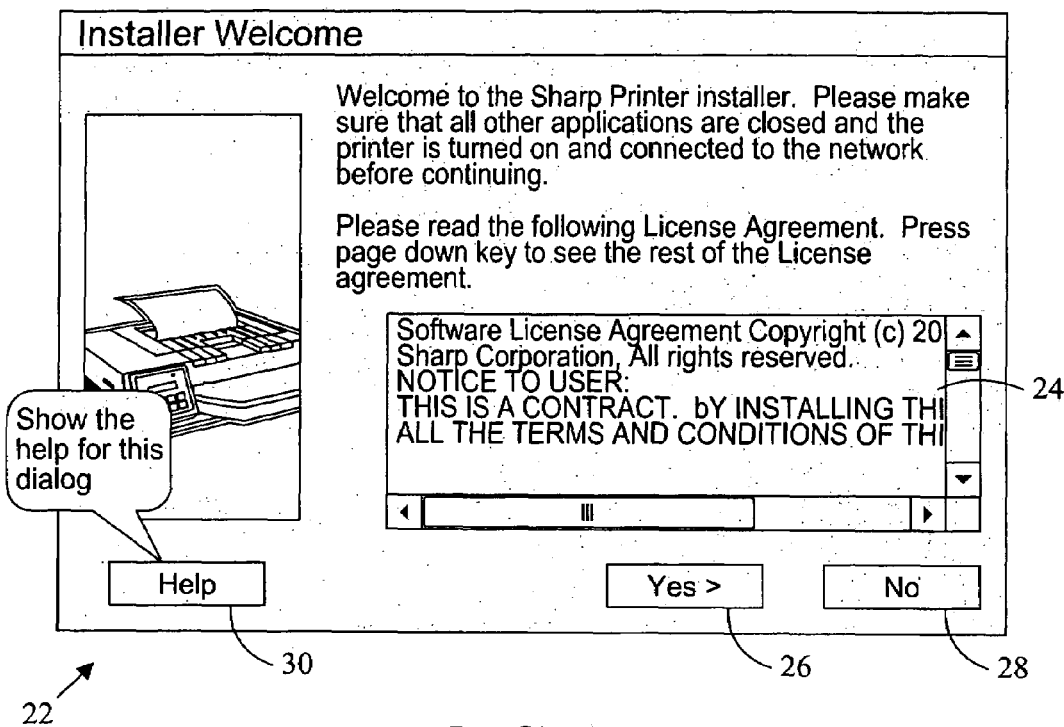
FIG. 3 is an exemplary "Installer Welcome" screen that may appear in response to the selection of the "Install Software" in the splash screen of FIG. 1 where the disclosed installation tool either detects Winsock 2.0 on a client computer with a Windows 95 operating system, or detects that the client computer uses an operating system other than Windows 95.
Figure 4:
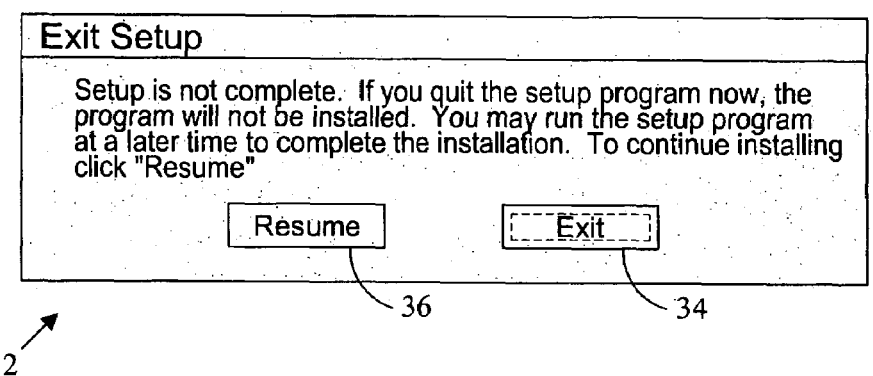
FIG. 4 is an exemplary "Exit Setup" screen that may appear in response to the selection of the "No" button in the Screen of FIG. 3.

If the printer installation tool does not require the presence of Winsock 2.0 to install a printer on a client computer running in a Windows 95 environment, or if Winsock 2.0 is present on a client computer running in a Windows 95 environment, or if the client computer runs on an operating system other than Windows 95, or if either administrative rights are not required or are present, the splash screen 10 will be replaced with the "Installer Welcome" screen 22 shown in FIG. 3 after a user selects the "Install Software" button 10.

The installer welcome screen 22 may present the user with a license agreement that may be selectively browsed in a window 24. The installer welcome prompts the user to either accept the license agreement by selecting the "Yes" button 26 or decline the license agreement by selecting the "No" button 28. If the license agreement is not accepted, operation of the printer installation tool may either terminate, or the user may be presented with an additional dialog window, shown in FIG. 4 giving the user the option of either terminating operation of the printer installation tool by selecting the "Exit" button 34 or to resume installation by selecting the "Resume" button 36, after which the user is once again prompted to either accept or decline the license agreement in the Installer Welcome" screen 22.

In one preferred embodiment of the disclosed printer installation tool, the UI scope is focused on the "No" button 28 of the Installer Welcome screen 22 so that a user cannot inadvertently accept the license agreement by carelessly clicking the "enter" button on the user's keypad. Rather, the license agreement can only be accepted, and the installation program can be completed, only upon the conscious selection of the "Yes" button 26. Other embodiments. Though, may focus the UI scope on the "No" button 28.

Figure 5:
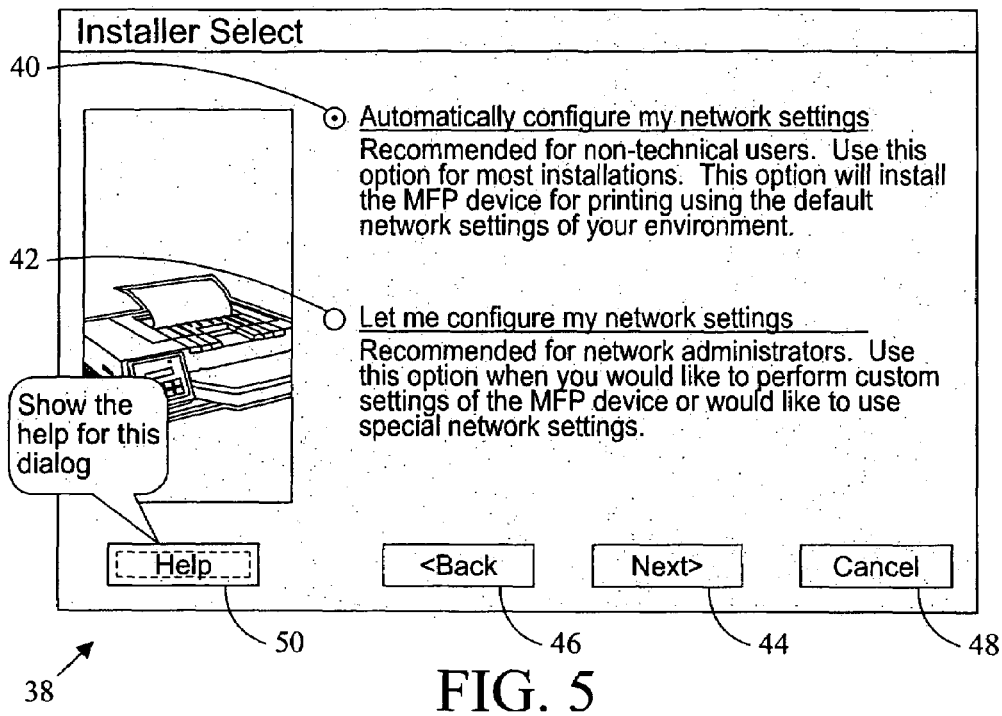
FIG. 5 is an exemplary "Installer Select" screen that may appear in response to the selection of the "Yes" button in the screen of FIG. 3.

Selection of the "Yes" button 26, which accepts the License agreement, may lead to the "Installer Select" screen 38, shown in FIG. 5, which gives a user the option of having the disclosed printer installation tool automatically configure a desired printer, or let the user configure the printer. This selection may be made by checking the desired one of the boxes 40 or 42 and subsequently selecting the "Next" button 44. Selection of the box 40 provides for an easy installation and selection of the box 42 provides for an advanced printer setting configuration for advanced users. Alternatively, the user may choose to go back to the previous screen by selecting the "Back" button 46, cancel installation by selecting the "Cancel" button 50, or initiate a help dialog window by selecting the "Help" button 50. Selection of the help button 50 may present a help dialog window (not shown) explaining the consequences of electing to configure the printer manually, along with a list of parameters which will need to be entered manually. The help dialog window may also suggest that novice users elect to let the installation program proceed with an automatic installation. Selection of the cancel button 48 may either terminate operation of the printer installation tool or present the user with an Exit setup window with the same functionality as the exit setup window 32 of FIG. 4. Unless otherwise indicated, any "back", "cancel" or "help" buttons in any of the dialog windows discussed in this disclosure are functionally equivalent to the respective buttons 46, 48, and 50 discussed in this paragraph.

Figure 6:
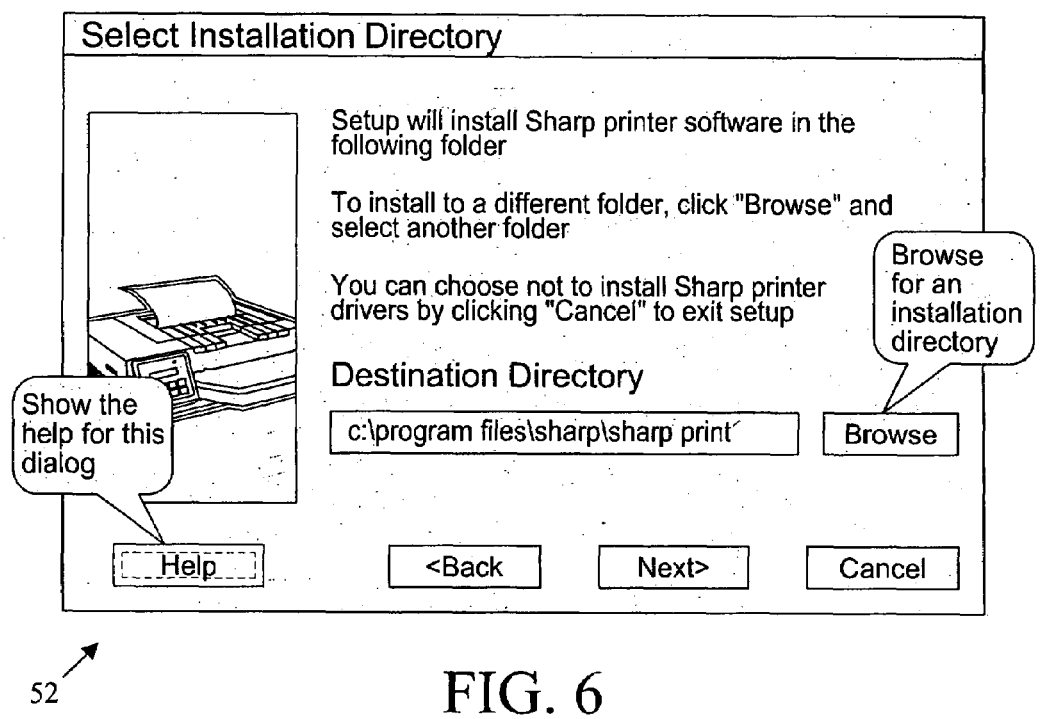
FIG. 6 is an exemplary "Select Installation Directory" screen that may appear in response to the selection of the "Next" button in the screen of FIG. 5.
Figure 7:
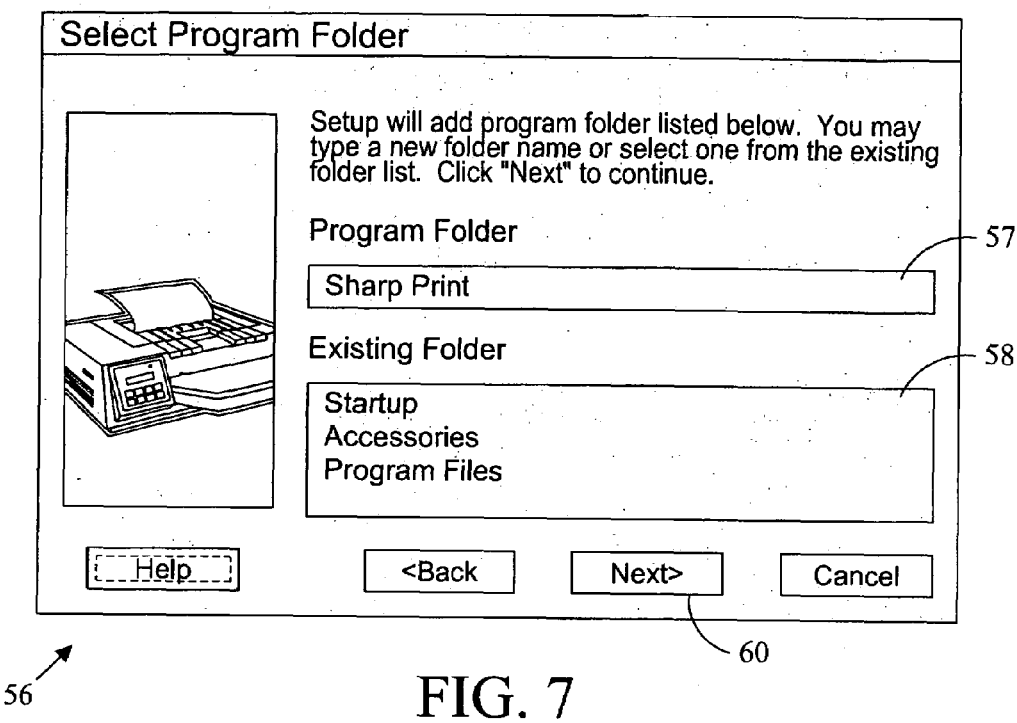
FIG. 7 is an exemplary "Select Program Folder" screen that may appear in response to the selection of the "Next" button in the screen of FIG. 6.
Figure 8:
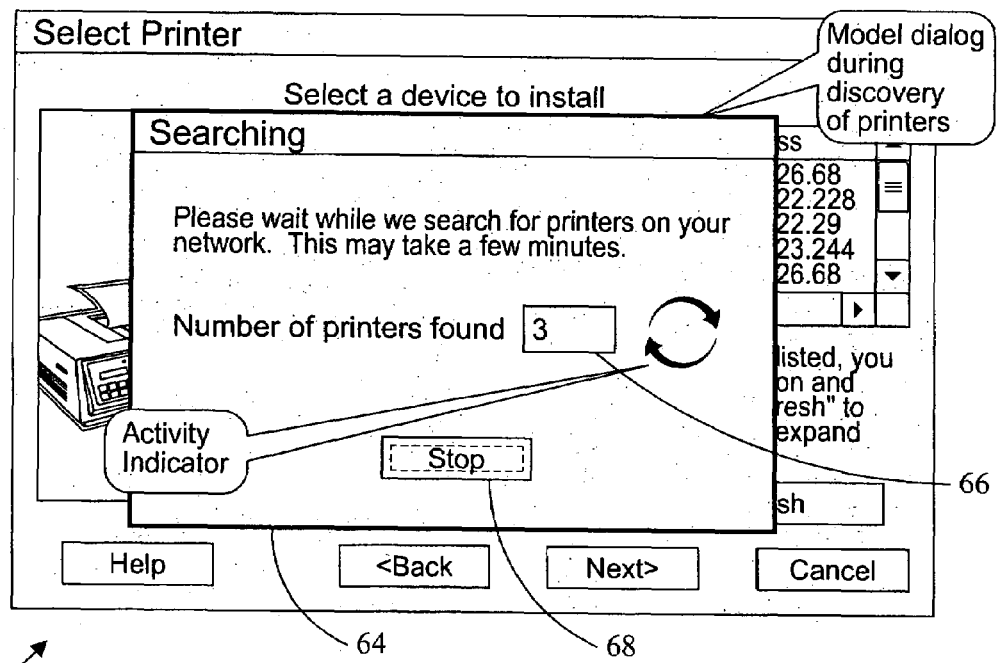
FIG. 8 is an exemplary screen that may appear in response to the selection of the "Next" button in the screen of FIG. 7, and while the printer installation tool searches for printers available to the client computer.

Referring to FIG. 6, if the client computer is running in a Windows 95 environment (e.g., an operating system without a port monitor), the selection of the desired installation option will cause the "Select Installation Directory" window 52 to appear, from which the user may either select a displayed default directory or input a new directory for an installation folder and proceed to a select program folder window 56, as shown in FIG. 7. The select program folder window 56 permits the user to input a desired program folder in the window 57 by either typing it in manually or selecting one of the existing folders detected by the printer installation tool and displayed in the window 58. Selection of the "Next" button 60 will cause the "Select Printer" window 62 to appear. Furthermore, if the client computer is operating within a Windows NT 4.0, a Windows 2000, or a Windows XP environment, selection of the "Next" button 44 in the "Installer Select" window 38 (FIG. 5) leads to the "Select Printer" window 62 (FIG. 8).

Initially, the "Select Printer" dialog window may be overlaid with a "Searching" window 64 that indicates to the user that the disclosed printer installation tool is detecting available printers for installation. The printer installation tool may use any appropriate protocol for this search, such as Simple Network Management Protocol (SNMP) or Common Management Information Protocol (CMIP). While the search is proceeding, a running count of detected available printers may be displayed in the box 66 and the user may be allowed to terminate the search by selecting the "Stop" button 68. Before displaying the "Select Printer" dialog, SLP files (slp.dll) will be copied to the temporary directory. The "select printer" dialog shows a list of discovered devices.

Figure 9:
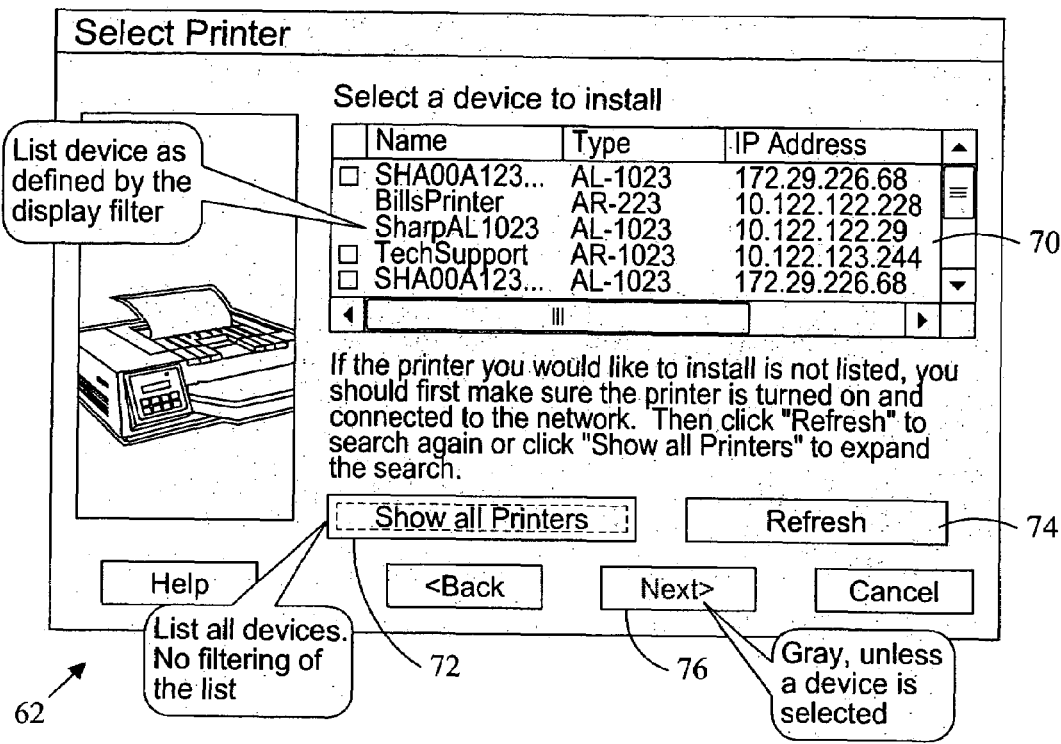
FIG. 9 is an exemplary screen that may appear in response to the selection of the "Next" button in the screen of FIG. 7, and after the printer installation tool has identified the printers available to the client computer.

Referring to FIG. 9, once the search has been completed, or the user stops the process, the "Searching" window 64 will disappear and the user will be presented with a list of printers, within the window 70. The disclosed printer installation tool may provide for a filtering tool that filters the list of printers shown in the window 70. For example, the filtering tool may first show only "new" devices, i.e., devices that were not previously discovered in an earlier iteration of the disclosed printer installation tool, or if this "new" list is empty then only "uninstalled" devices, i.e. those devices that have not been previously configured, or if the "uninstalled" list is empty then all discovered devices. This simplifies the installation of new printers on a network by showing the new printers without showing all the previously installed printers (or less than all). The user may also elect to show all available printers rather than a presented filtered list by selecting the button 72. If all devices are being shown then the "Show all Printers" button 72 will be gray. Further, the disclosed printer installation tool may include a "refresh" button 74 to be selected if a desired printer is not shown and a further search is desired after connections are checked, etc. In some embodiments of the disclosed printer installation tool, the user can select more than one device to perform a multi device installation.

The printer device itself may include a flag (memory location) that may be set by the installation tool to indicate that the printer has now been installed with the flag being unset as default (or vice versa). In this manner, the installation tool may query the printer for the flag. The flag may be reset in any suitable manner.

The filtering criteria may be achieved by processing installation flag values retrieved from the client computer and/or server through SNMP operation and a file containing a list of previously discovered devices. The Installation Flag value will give the information on whether the printer is installed or not configured at all in the network.

Optionally, the location of the printer may be displayed when the focus of the mouse is on the row of the printer.

At this point, the user has the option of choosing an advanced configuration or an automatic configuration. The advanced configuration option will be discussed first.

Advanced Configuration

Figure 10:
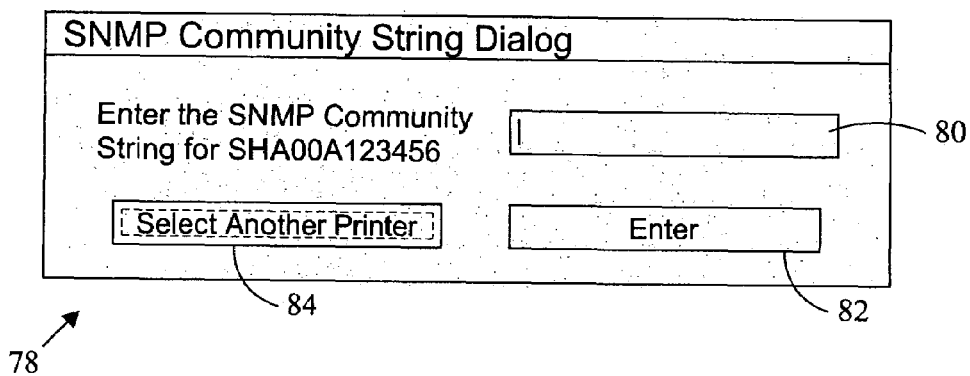
FIG. 10 is an exemplary screen that may appear in response to the selection of the "Next" button in the screen of FIG. 9, and where the user selected the "Let me configure my network setting" option in the screen of FIG. 5.

If the User opted for "Let me configure my Network Setting" 42 in the "installer select" dialog box 38 (FIG. 5), upon selecting the "next" button 76 the disclosed printer installation tool will check to see whether the SNMP Community string of the selected device is the default value. If the SNMP community string is not the default value (see box 238 of FIG. 25), the user will be presented with the dialog window so that he can enter the correct string for the selected device in the window 80 and press the "enter" button 82 or return to the "Select Printer" dialog by pressing the button 84, as illustrated in FIG. 10. If the SNMP community string is incorrect the user will again be prompted to enter the correct SNMP Community string.

The "Advanced Printer Configuration" window 98 (see FIG. 12) allows the entry of an IP address for the printer, a subnet mask identifier, and a default gateway, by entries into the appropriate windows 99, 100, and 101. These entries may be made automatically by selecting the box 102 via DHCP or the values may be specified manually after selecting the box 103. Specifying either an invalid address or an address already being used, and selecting the "next" button 104 will result in the Error Message Windows 106 and 107, respectively where the user will be prompted to enter correct values (see FIGS. 13 and 14).

Figures 24, 25:
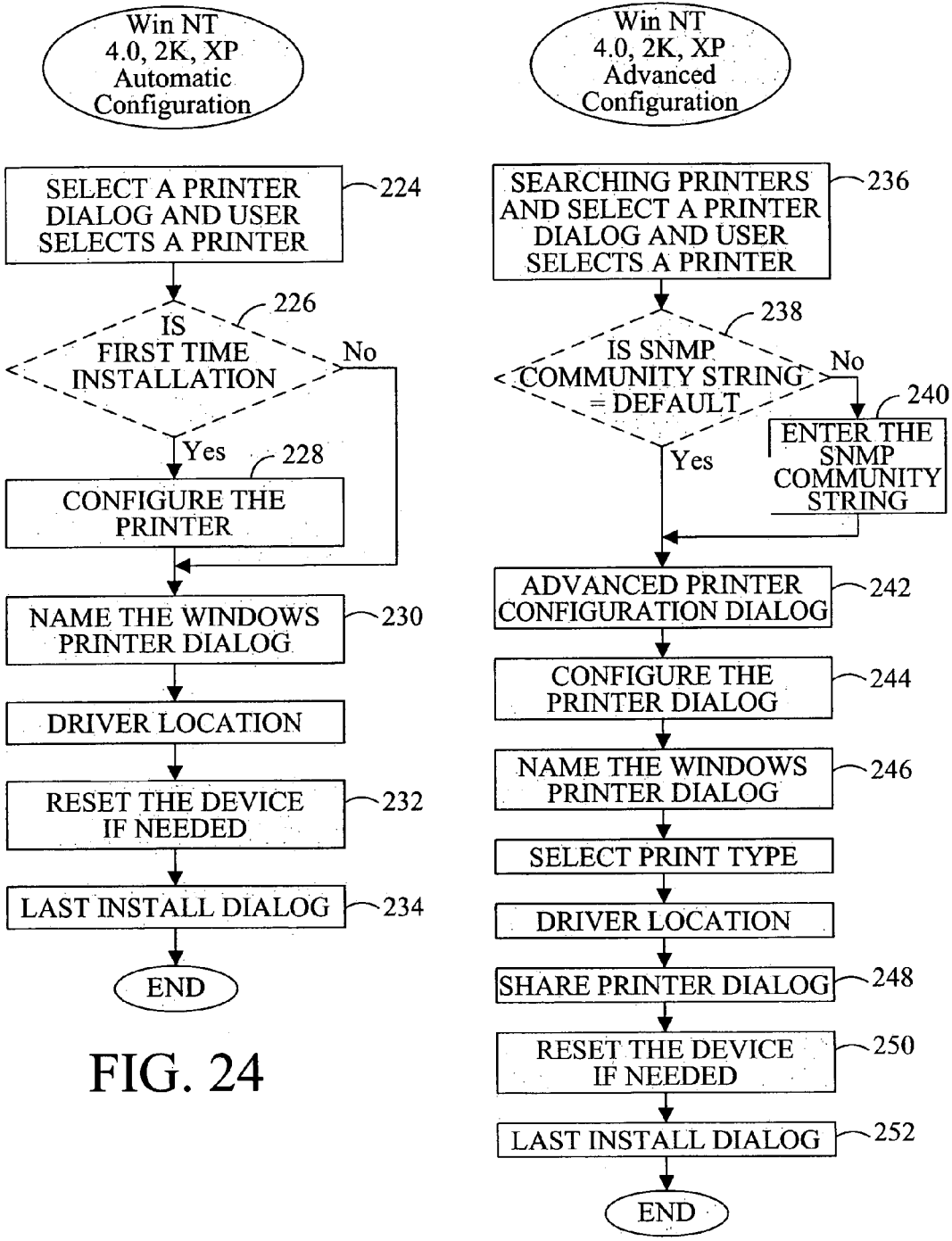

In either automatic or advanced configuration, the "Configure the Printer" window 108 (see FIG. 15) will appear in response to the selection of the "next" button 104 (see FIG. 12 advanced configuration) or the next button 76 (see FIG. 98 automatic configuration) in the case that it is a first time installation (see FIG. 24). The window 108 allows the user to name the device and optionally provide a location description in the appropriate windows 109 and 110. The description 110 may subsequently be displayed together with the name of the device, such as with a mouse or other window. This provides additional descriptive information to a subsequent installer of the same printer. A default name may be initially displayed in the window 109. The default name that is displayed should be the device name retrieved from the printer, and is preferably limited to 15 characters and follows the DNS naming convention (no spaces, no special characters). The user can change this name so long as it follows the aforementioned length limitations. This name and location string is written back to the printer using SNMP or CMIP and the printer will register this name with the WINS/DNS server.

Continued Automatic/Advanced Configuration

Figure 17:
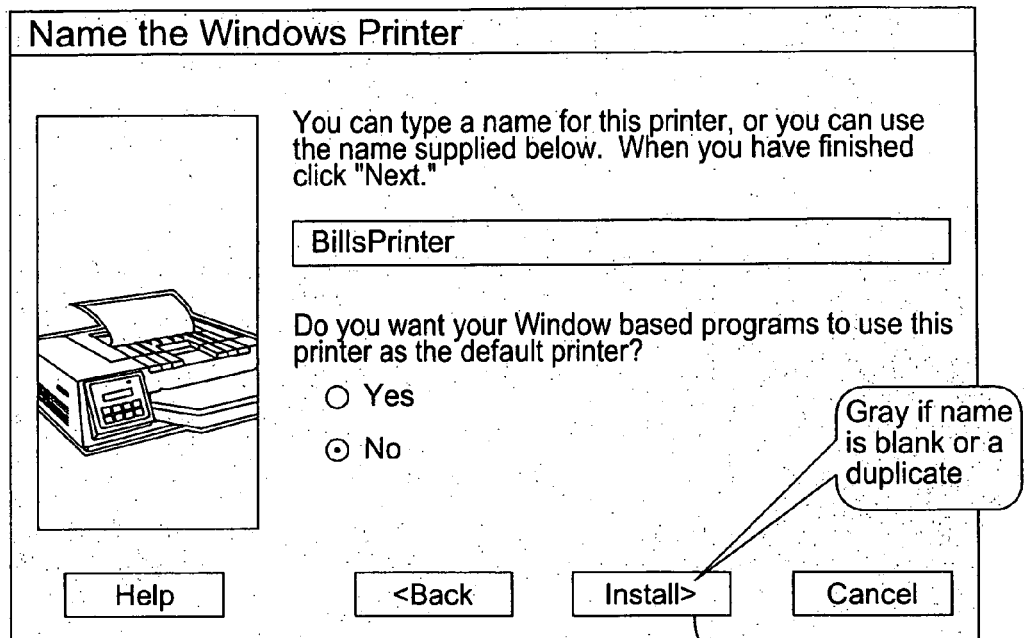
FIG. 17 is an exemplary screen that may appear in response to the selection of the "OK" button in the screen of FIG. 16.

Typically, when a user selects the "Next" button 112 of the "Configure the Printer" window 112 (see FIG. 15), the "Name the Printer" window 118 will appear (see FIG. 17).

The "Name the Printer" window 118 is similar to the Add Printer Wizard dialog used in the Windows operating system. The "Name the Windows Printer" 118 allows the user to give a Windows name of the printer. The default will be the name of the printer in the installed machine. Using this window, a user has the option of giving the printer an intuitive name by which the user may subsequently recognize that particular printer when sending it a print job so that the user can locate the printer and easily retrieve the completed print job. This eliminates difficulty in distinguishing identical printers on a network that all have the same or similar default identifications.

In the advanced configuration, if the printer is shared in, the "Select Print Type" window may be displayed (See FIG. 11B) so that the user has the option, by selecting the appropriate box 94 or 95, of installing the printer as a peer-to-peer, i.e. connected directly to a network or as a network printer, i.e. connected to a network server through another network computer (e.g., a server). Selection of the "Next" button 96 will show the "Driver Location" window 114 (shown in FIG. 16).

In either the automatic or advanced configuration the "Driver location" window allows the user to select the appropriate driver to install. Normally this is only displayed when the system can not locate the appropriate driver.

Insert C

Figure 11A:
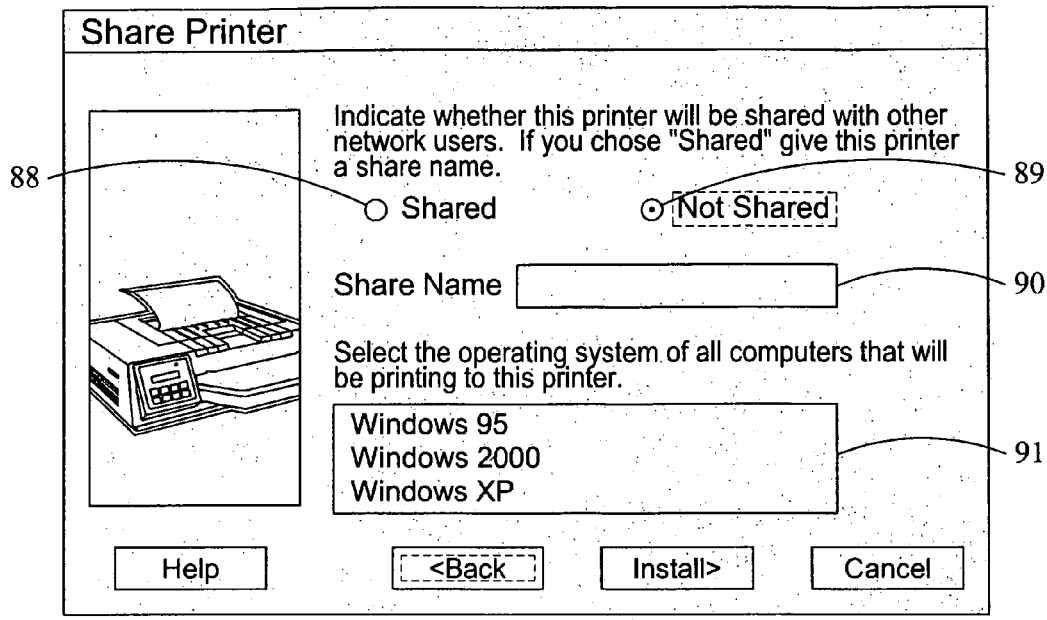
FIG. 11A is an exemplary screen that may appear in response to the selection of the "Enter" button in the screen of FIG. 10.
Figure 11B:
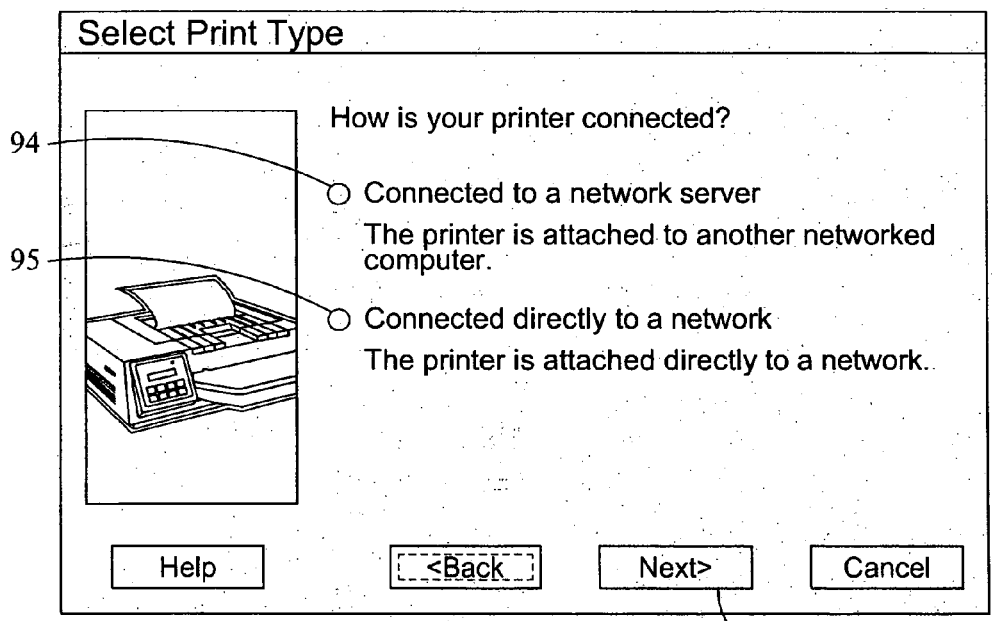
FIG. 11B is an exemplary screen that may appear in response to the selection of the "Enter" button in the screen of FIG. 11A
Figure 12:
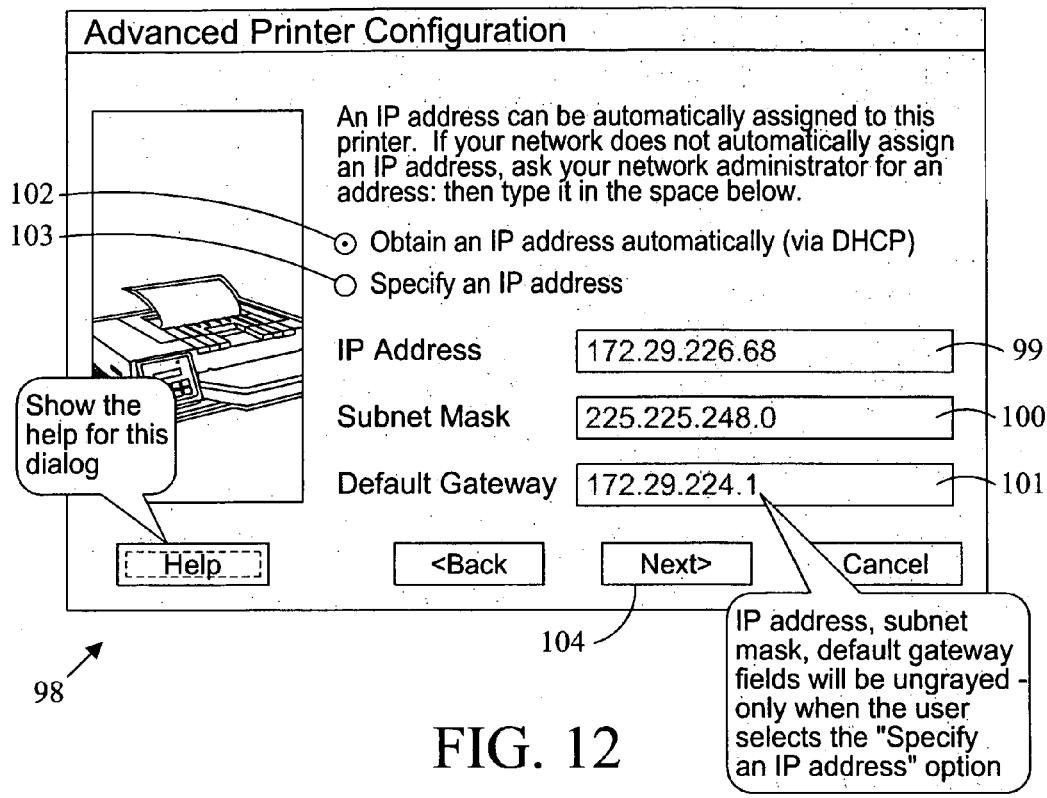
FIG. 12 is an exemplary screen that may appear in response to the selection of the "Next" button in the screen of FIG. 11A.
Figure 13:
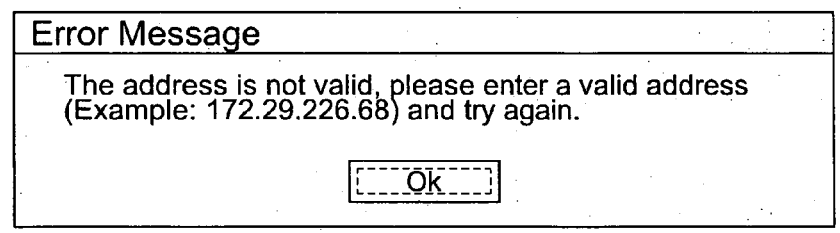
FIG. 13 is an exemplary screen that may appear in response to the selection of the "Next" button in the screen of FIG. 12 and if the printer installation tool does not recognize the address provided in response to the screen of FIG. 12.
Figure 14:
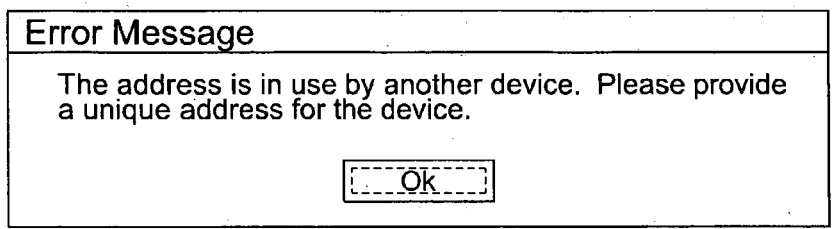
FIG. 14 is an exemplary screen that may appear in response to the selection of the "Next" button in the screen of FIG. 12 and if the address provided in response to the screen of FIG. 12 is already in use.
Figure 15:
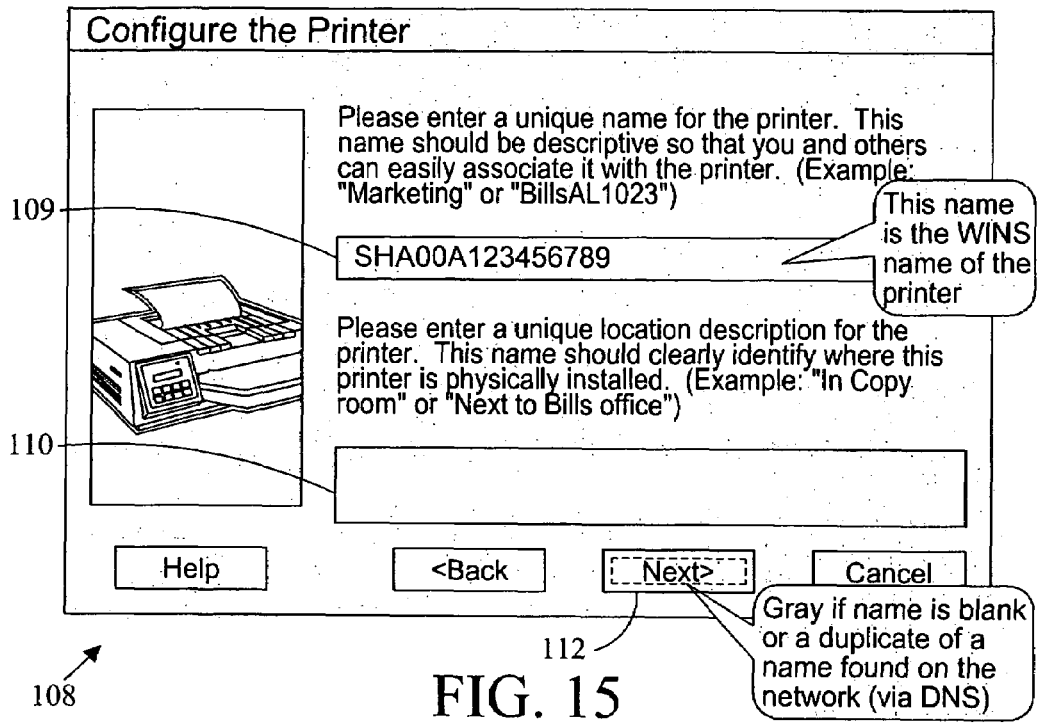
FIG. 15 is an exemplary screen that may appear in response to the selection of the "Next" button in either the screen of FIG. 9 where the user selected the "Automatically configure my network settings" button in the screen of FIG. 5, or in response to the selection of the "Next" button in the screen of FIG. 12 where the printer installation tool recognize the address provided in response to the screen of FIG. 12, and if that address is not used by another device.

In the case of advanced configuration for non-win 9x, if direct printing as a result of FIG. 11B is selected a "Share Printer" window 86, shown in FIG. 11A may be displayed by which the user may indicate whether the printer is to be shared or not by selecting the appropriate box 88 or 89, give a share name in the window 90 and select the operating system of all the computers printing to the selected printer from the list shown in the window 91.

Figure 18:
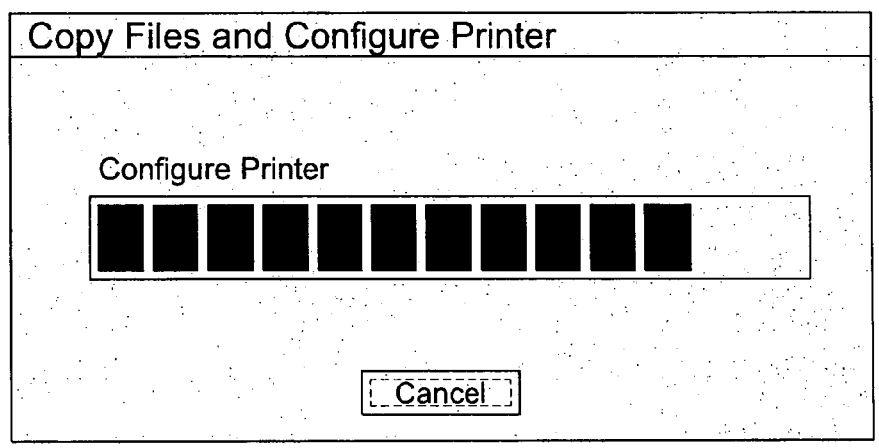
FIG. 18 is an exemplary screen that may appear in response to the selection of the "Install" button in the screen of FIG. 17.
Figure 19:
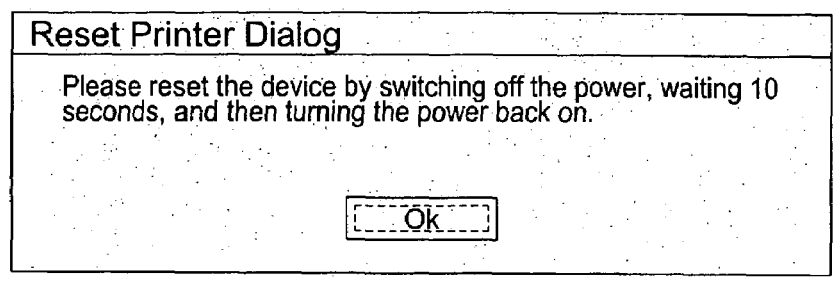
FIG. 19 is an exemplary "Printer Reset" Screen.

Clicking the "Install" button 120 leads to the copy files and configure printer screen 122 of the installation process (see FIG. 18). When displaying the window 122, the disclosed printer installation tool may do three additional things. First, it may push the configurable attribute values to the installed printer. Second, it may check whether the installed printer started using those values. Finally, the disclosed printer installation tool may configure the client computer so that it can print to the printer The disclosed printer installation tool starts configuring the print server with user configured new values, the Copy files and Configure printer window 122 may tell the user to "Please wait while configuring the device" above a progress bar. The message "Please wait while configuring the device" should preferably be displayed for approximately ten seconds beyond the actual download time or until the printer installation tool has detected that the client computer has started using the new parameters whichever is shorter.

After pushing the configurable values to the printer, the disclosed printer installation tool checks whether the printer is using the configured values. If it finds that the device is not using the currently configured values, it may shows the "reset printer" window 124 (see FIG. 19). This dialog should be displayed only as long as the device still contains its old/original parameters. For example: if the address has been changed and the printer is still answering pings on its old address. (If the device has started using the new parameters, this dialog can be skipped.)

After the reset, if the device is not responding to any queries, another window (not shown) may display the text, "Waiting for the device to initialize, Please make sure that the power is on" in the Copy files and configure printer. This message should be shown only as long as the device is not responding to any queries on any address. (If the device has started using the new parameters, this dialog can be skipped.)

If the device started responding, the next message displays is the "Waiting for the device to initialize" in the copy files and configure printer dialog. This should be shown only as long as the device is responding but has not set all parameters. For example: the printer is responding to Pings but the new Name is not set. (If the device has started using the new parameters, this dialog can be skipped.)

Once the installed printer configuration and validation is done, the disclosed printer installation tool may start configuring the client computer. First it copies the port monitor. Then it installs and configures the port monitor while optionally displaying the text "Configuring the port monitor". Then the tool installs the printer driver while optionally displaying the text "Installing the printer driver" in the "copy file and configure the printer" 122.

Figure 20:
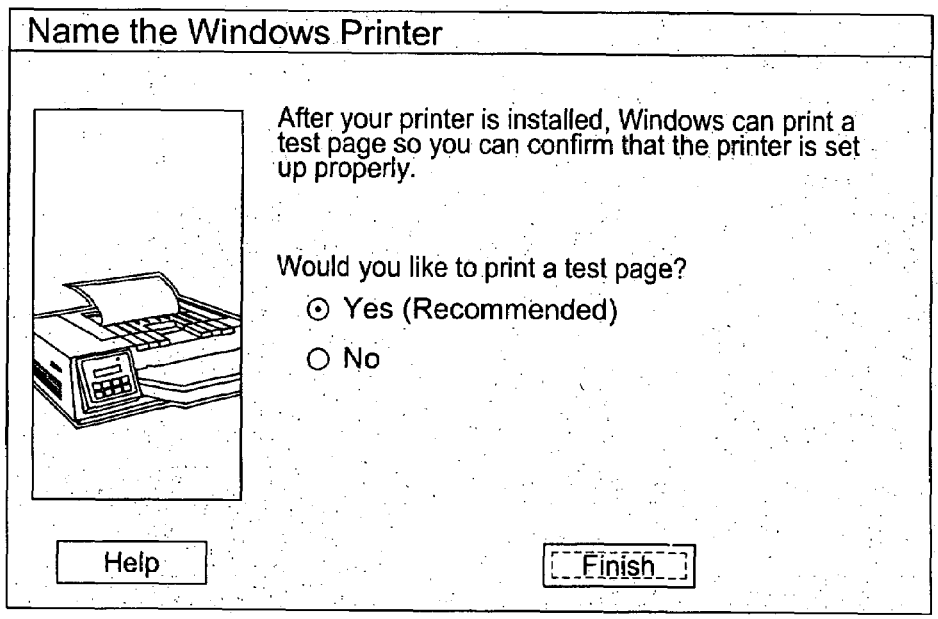
FIG. 20 is an exemplary "Last Install" screen that may appear when the printer installation tool has installed the printer selected in the screen of FIG. 9.

On completing host and printer configuration, the disclosed printer installation tool displays the "Last Install" window 126 (See FIG. 20).

The foregoing installation tool may be used with any computer operating system, such as Windows, DOS, Linux, Unix, etc. Some embodiments of the installation tool may be configured for use with an individual one of these operating systems, or alternatively may be capable of installing a printer on any number of operating systems. For example, FIGS. 21A to 25 illustrate an embodiment for the disclosed installation tool that is able to install and configure a printer on a host computer that operates under either Windows 9x, Windows NT, Windows 2K or Windows XP.

Figure 21A:
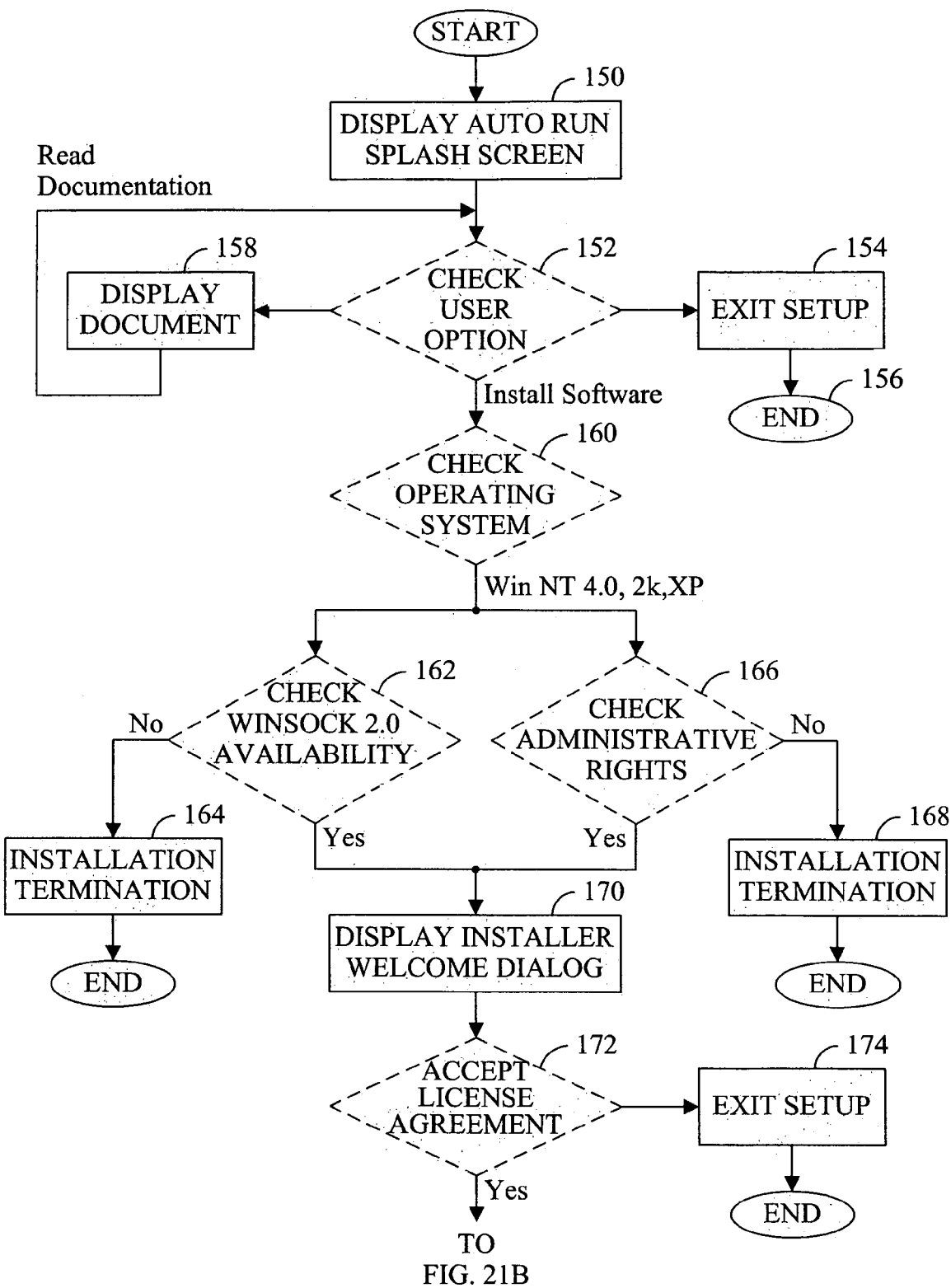
FIGS. 21A-25 are diagrams illustrating exemplary steps used by a disclosed printer installation tool.
Figure 21B:
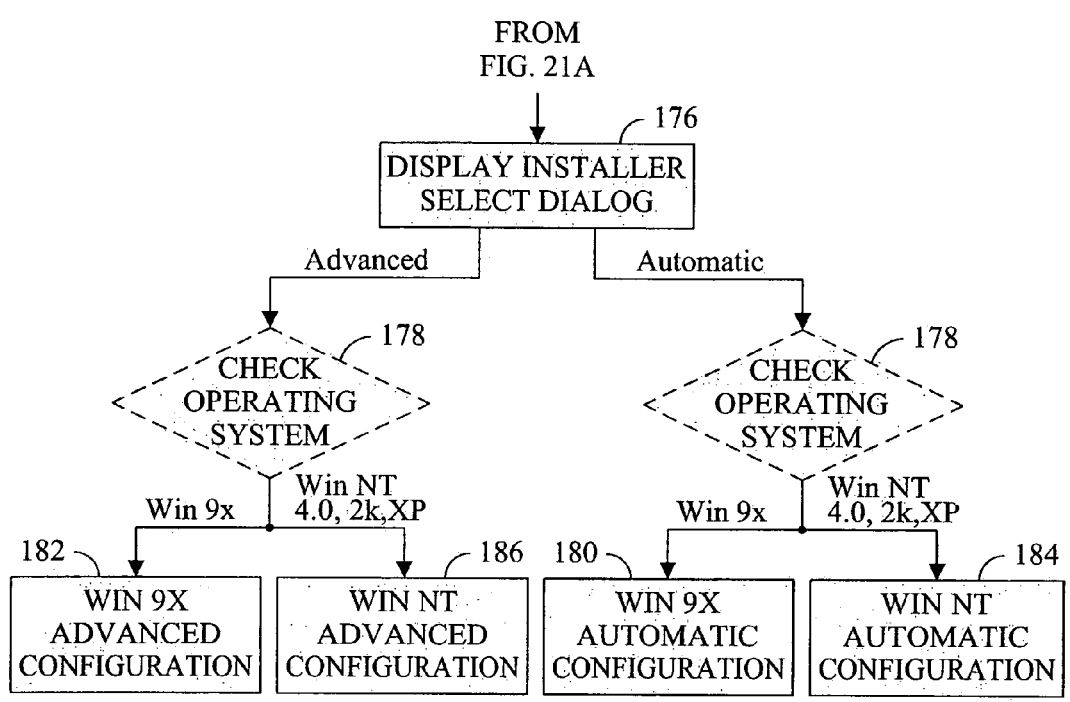

Referring specifically to FIGS. 21A and 21B, this embodiment of the disclosed installation tool begins by displaying 150 an introductory screen, such as the splash screen 10 shown in FIG. 1 or any other similar screen. The introductory screen may be initiated from either the insertion of a CD that contains an executable installation tool into CD-ROM drive, by downloading the installation tool from the internet, or by selecting an executable installation tool program file within a Windows operating system, including a DOS prompt. The introductory screen preferably presents a user with the option 152 of proceeding with the printer installation, reviewing any associated documentation, or exiting the installation tool.

If the user elects to exit 154 the installation tool, the installation tool may then terminate 156. If the user elects to review associated documentation, the installation tool may display 158 the associated documentation to the user so that it may be read. Once the user has indicated that he or she has finished reading the documentation, the user may once again be presented with the introductory screen and given the option of whether continuing with the installation or terminating the installation.

If the user elects to continue with the installation, the installation tool may identify 160 the operating system of the host computer. If the host computer is operating on a Windows 95 operating system, the installation tool may check 162 whether Winsock 2.0 is installed in the windows directory. If Winsock 2.0 is not installed, then the installation tool may terminate 164 after preferably indicating to the user that installation cannot proceed because of the missing file. If Winsock 2.0 is available in a Windows 95 operating system, the installation tool may proceed and display and Installer Welcome Dialog 170.

Similarly, if the host computer is operating on a Win NT 4.0, Windows 2k, or Windows XP operating system, the installation tool may check 166 whether administrative rights are needed to install a printer, and if so, determine whether the user has such administrative rights. If not, the installation tool may terminate 168, else proceed and display the installer welcome dialog 170.

The installer welcome dialog 170 may be presented in a user interface such as that shown in FIG. 3. Preferably, the installer welcome dialog 170 warns the user to terminate any other application that may be running on the host computer and to make sure that the printer to be installed is turned on and connected to the host computer either locally or through a network. Also, the installer welcome dialog 170 preferably presents the user with a license agreement that may be either accepted or declined. If the user declines the license agreement, the installation tool may be terminated 174. If the user accepts the license agreement, the installation tool may proceed and display an installer select dialog 176.

The installer select dialog 176 may be presented in a user interface such as that shown in FIG. 5. The Installer select dialog preferably gives the user the option of selecting an automatic configuration where the installation tool configures the selected printer using default network settings, or an advanced configuration where the user customizes the settings of the selected printer. Once the user has made the desired selection, the installation tool may identify 178 the operating system of the host computer.

The embodiment of the disclosed installation tool presently being discussed is capable of installing a printer within any of the Windows 9x, Win NT 4.0, Win 2K, or Windows XP operating systems. In this embodiment, four possible installation procedures may be used: a Win 9x automatic configuration 180, a Win 9x advanced configuration 182, a Win NT 4.0/2k/XP automatic configuration 184, or a Win NT 4.0/2k/XP advanced configuration 186.

Figure 22:
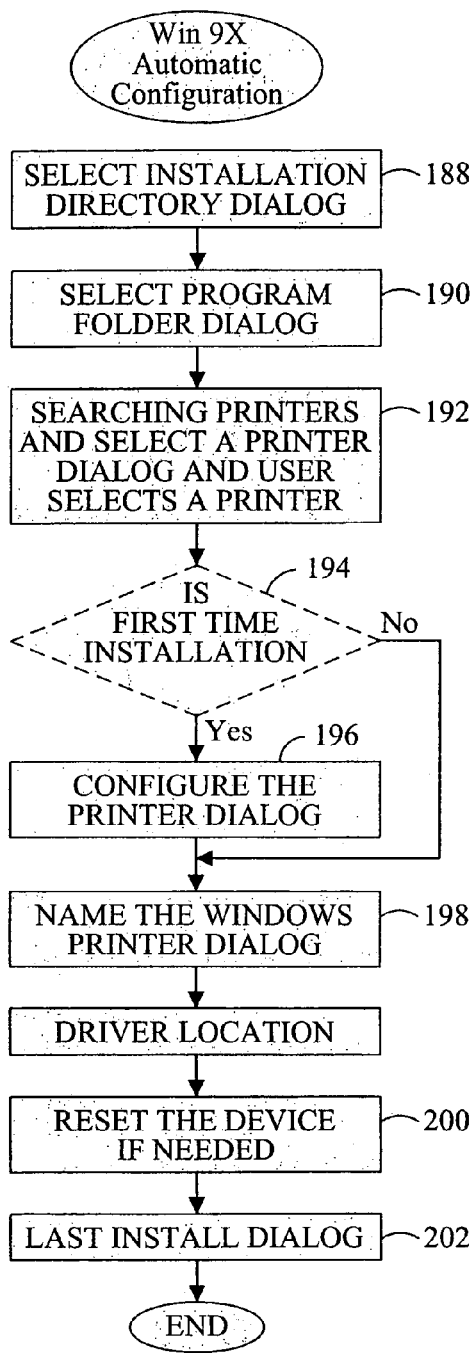

Referring to FIG. 22, if the user selected an automatic configuration and the host computer operates on a Win 9x operating system, the user may be presented with a dialog 188 in which the user can select an installation directory. The dialog 188 may be presented in a user interface like that shown in FIG. 6. Some embodiments of the disclosed installation tool will have default directory indicated within the user interface so that the user only needs to hit the enter key to proceed, or may alternately override the default selection and either choose another, existing directory or create a new directory.

Once an installation directory has been selected or created, the user may be presented with a dialog 190 in which the user can select a program folder for the installation tool. The dialog 190 may be presented in a user interface like that shown in FIG. 7. Some embodiments of the disclosed installation tool will have default program folder indicated within the user interface so that the user only needs to hit the enter key to proceed, or may alternately override the default selection and either choose another, existing program folder or create a program folder.

Once a program folder has been created, the installation tool may perform a search to identify 192 the available printers that can be installed and present a list of such computers to the user. The printer installation tool may use any appropriate protocol for this search, such as Simple Network Management Protocol (SNMP) or Common Management Information Protocol (CMIP). While the search is proceeding, a running count of detected available printers may be displayed to the user. Some embodiments of the disclosed installation tool may allow the user to terminate the search at any time. If the user stops the search while it is proceeding, the user may still be allowed to select from the list already compiled.

Once the user selects an available printer from the presented list, the installation tool performs a check 194 to see whether the selected printer is being installed for the first time. If so, the user may be presented with a dialog 196 to configure the printer. The dialog 196 may be presented in a user interface like that shown in FIG. 15. In the dialog 196, the user is allowed to name the device and optionally provide a location description for the printer. A default name may be initially displayed by the dialog 196. The default name that is displayed should be the device name retrieved from the printer, and is preferably limited to 15 characters and follows the DNS naming convention (no spaces, no special characters). The user can change this name so long as it follows the aforementioned length limitations. This name and location string is written back to the printer using SNMP or CMIP and the printer will register this name with the WINS/DNS server. This step may be skipped if the printer has previously been installed. This permits subsequent installations for the user to merely select next to install the printer properly.

Once the printer has been configured by the user, or alternately if the printer had been previously configured, the user may be presented with a dialog 198 to name the printer. The dialog 198 may be presented in a user interface similar to that shown in FIG. 17. The dialog 198 allows the user to give a Windows name of the printer. The default will be the name of the printer in the installed machine. Using this window, a user preferably has the option of giving the printer an intuitive name by which the user may subsequently recognize that particular printer when sending it a print job so that the user can locate the printer and easily retrieve the completed print job. The dialog 198 may also preferably allow the user to select the printer as the default windows computer for local print jobs.

Figure 16:
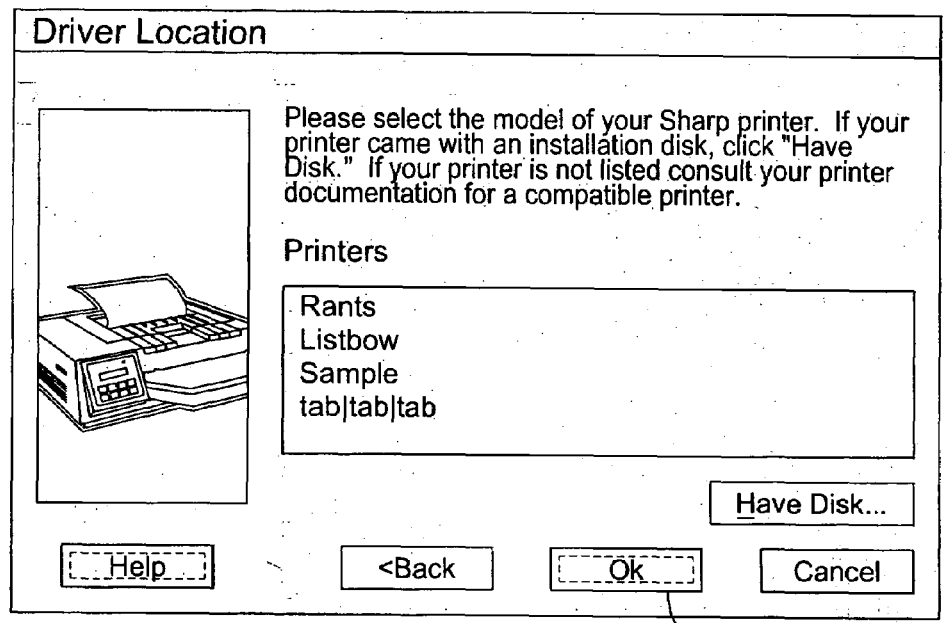
FIG. 16 is an exemplary screen that may appear in response to the selection of the "Next" button in the screen of FIG. 15.

Once the user has configured and named the selected printer, the installation tool may request the driver location as illustrated in FIG. 16 and then the disclosed installation tool may push the configuration parameters back to the host computer/server using SNMP protocols and updating the printer's DNS name. This step may not be necessary if no values have changed, i.e. the default values were selected. If, however, any value has been changed, the installation tool will preferably check whether the printer started using the new values pushed to the printer. If the printer is not started using the new values, the installation tool may reset 200 the printer and verify the printer on resetting starts using the new values.

Once the printer has been verified to use the new parameters, the installation tool may create a new LPR port and add registry entries, install the Printer driver on to the newly created port, and prompt the user to print a test page, send the test printer data to the printer. The user may then be presented with a last install dialog 202 and the installation tool will then terminate.

Figure 23:
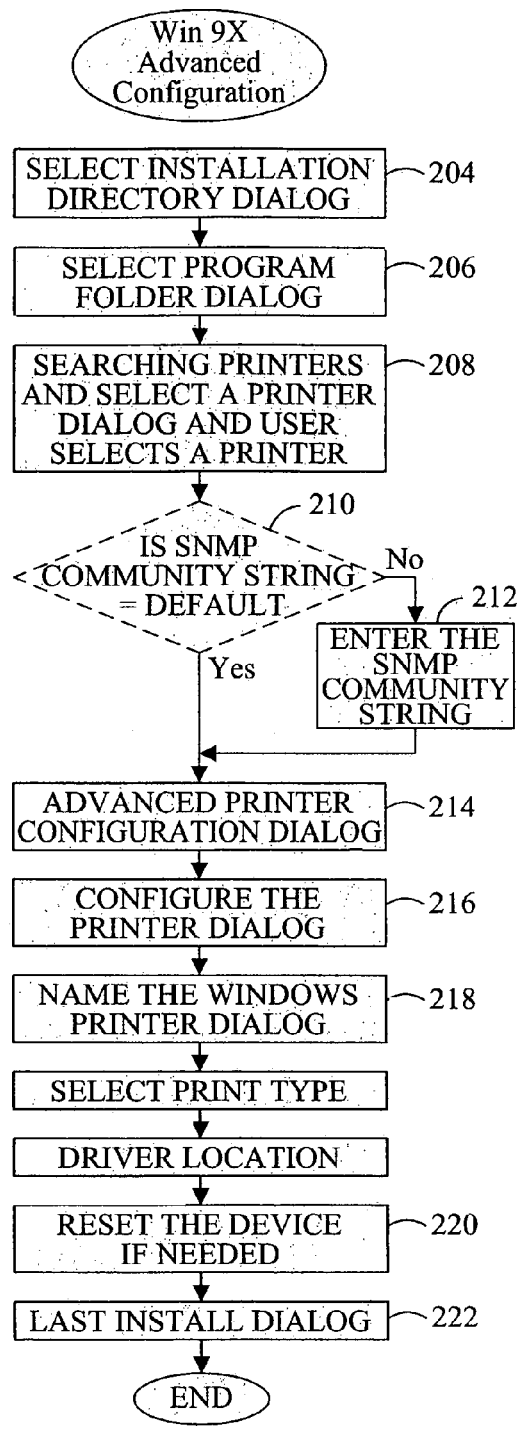

Referring to FIG. 23, if the user selected an advanced configuration and the host computer operates on a Win 9x operating system, the user may be presented with a dialog 204 in which the user can select an installation directory. The dialog 204 may be presented in a user interface like that shown in FIG. 6. Some embodiments of the disclosed installation tool will have default directory indicated within the user interface so that the user only needs to hit the enter key to proceed, or may alternately override the default selection and either choose another, existing directory or create a new directory.

Once an installation directory has been selected or created, the user may be presented with a dialog 206 in which the user can select a program folder for the installation tool. The dialog 206 may be presented in a user interface like that shown in FIG. 7. Some embodiments of the disclosed installation tool will have default program folder indicated within the user interface so that the user only needs to hit the enter key to proceed, or may alternately override the default selection and either choose another, existing program folder or create a program folder.

Once a program folder has been created, the installation tool may perform a search 208 to identify the available printers that can be installed and present a list of such computers to the user. The printer installation tool may use any appropriate protocol for this search, such as Simple Network Management Protocol (SNMP) or Common Management Information Protocol (CMIP). While the search is proceeding, a running count of detected available printers may be displayed to the user.

Some embodiments of the disclosed installation tool may allow the user to terminate the search at any time. If the user stops the search while it is proceeding, the user may still be allowed to select from the list already compiled.

Once the user selects an available printer from the presented list, the installation tool performs a check 210 to see whether the SNMP Community string of the selected device is the default value. If the SNMP community string is not the default value, the user will be presented with a dialog 212 so that the user can enter the correct string for the selected device or return to the dialog 208. If the SNMP community string is incorrect the user will again be prompted to enter the correct SNMP Community string.

Once the disclosed installation tool has verified that the correct SNMP community string has been entered, the user may be presented with an advanced printer configuration dialog 214. The dialog 214 allows the entry of an IP address for the printer, a subnet mask identifier, and a default gateway. These entries may be made automatically via DHCP or the values may be specified manually. Specifying either an invalid address or an address already being used will preferably result in an error message where the user will be prompted to enter correct values. Otherwise, a printer configuration dialog 216 will appear.

The dialog 216 allows the user to name the device and optionally provide a location description. A default name may be initially displayed in the dialog 116. The default name that is displayed should be the device name retrieved from the printer, and is preferably limited to 15 characters and follows the DNS naming convention (no spaces, no special characters). The user can change this name so long as it follows the aforementioned length limitations. This name and location string is written back to the printer using SNMP or CMIP and the printer will register this name with the WINS/DNS server.

Once the printer has been configured in the dialog 216, the user may be presented with a "Driver location" window (not shown) where the user may select the appropriate driver to install, at which point the dialog 218 will appear to name the printer.

The dialog 218 may be presented in a user interface similar to that shown in FIG. 17. The dialog 218 allows the user to give a Windows name of the printer. The default will be the name of the printer in the installed machine. Using this window, a user preferably has the option of giving the printer an intuitive name by which the user may subsequently recognize that particular printer when sending it a print job so that the user can locate the printer and easily retrieve the completed print job. The dialog 218 may also preferably allow the user to select the printer as the default windows computer for local print jobs.

Once the user has configured and named the selected printer, the installation tool may request the driver location as illustrated in FIG. 16, the installation tool may select the print type as illustrated in FIG. 11B, and the disclosed installation tool may push the configuration parameters back to the host computer/server using SNMP protocols and updating the printer's DNS name. This step may not be necessary if no values have changed, i.e. the default values were selected. If, however, any value has been changed, the installation tool will preferably check whether the printer started using the new values pushed to the printer. If the printer is not started using the new values, the installation tool may reset 220 the printer and verify the printer on resetting starts using the new values.

Once the printer has been verified to use the new parameters, the installation tool may creates a new LPR port and add registry entries, install the Printer driver on to the newly created port, and prompt the user to print a test page, send the test printer data to the printer. The user may then be presented with a last install dialog 222 and the installation tool will then terminate.

Referring to FIG. 24, if the user selected an automatic configuration and the host computer operates on any of a Win NT 4.0, a Win 2k, or a Win XP operating system, the user need not select any installation directory or program folders. Instead the user may be immediately presented with a dialog 224 following a search is performed to identify the available printers that can be installed and present a list of such computers to the user. The printer installation tool may use any appropriate protocol for this search, such as Simple Network Management Protocol (SNMP) or Common Management Information Protocol (CMIP). While the search is proceeding, a running count of detected available printers may be displayed to the user. Some embodiments of the disclosed installation tool may allow the user to terminate the search at any time. If the user stops the search while it is proceeding, the user may still be allowed to select from the list already compiled.

Once the user selects an available printer from the presented list in the dialog 224, the installation tool performs a check 226 to see whether the selected printer is being installed for the first time. If so, the user may be presented with a dialog 228 to configure the printer. The dialog 228 may be presented in a user interface like that shown in FIG. 15. In the dialog 228, the user is allowed to name the device and optionally provide a location description for the printer. A default name may be initially displayed by the dialog 228. The default name that is displayed should be the device name retrieved from the printer, and is preferably limited to 15 characters and follows the DNS naming convention (no spaces, no special characters). The user can change this name so long as it follows the aforementioned length limitations. This name and location string is written back to the printer using SNMP or CMIP and the printer will register this name with the WINS/DNS server. This step may be skipped if the printer has previously been installed.

Once the printer has been configured by the user, or alternately if the printer had been previously configured, the user may be presented with a dialog 230 to name the printer. The dialog 230 may be presented in a user interface similar to that shown in FIG. 17. The dialog 230 allows the user to give a Windows name of the printer. The default will be the name of the printer in the installed machine. Using this window, a user preferably has the option of giving the printer an intuitive name by which the user may subsequently recognize that particular printer when sending it a print job so that the user can locate the printer and easily retrieve the completed print job. The dialog 230 may also preferably allow the user to select the printer as the default windows computer for local print jobs.

Once the user has configured and named the selected printer, the installation tool may request the driver location as illustrated in FIG. 16, and the disclosed installation tool may push the configuration parameters back to the host computer/server using SNMP protocols and updating the printer's DNS name. This step may not be necessary if no values have changed, i.e. the default values were selected. If, however, any value has been changed, the installation tool will preferably check whether the printer started using the new values pushed to the printer. If the printer is not started using the new values, the installation tool may reset 232 the printer and verify the printer on resetting starts using the new values.

Once the printer has been verified to use the new parameters, the installation tool may creates a new LPR port and add registry entries, install the Printer driver on to the newly created port, and prompt the user to print a test page, send the test printer data to the printer. The user may then be presented with a last install dialog 234 and the installation tool will then terminate.

Referring to FIG. 25, if the user selected an advanced configuration and the host computer operates on any of a Win NT 4.0, a Win 2k, or a Win XP operating system, the user may be immediately presented with a dialog 236 in which the user is presented with a list of available printers for configuration after the installation tool has completed a search. The printer installation tool may use any appropriate protocol for this search, such as Simple Network Management Protocol (SNMP) or Common Management Information Protocol (CMIP). While the search is proceeding, a running count of detected available printers may be displayed to the user. Some embodiments of the disclosed installation tool may allow the user to terminate the search at any time. If the user stops the search while it is proceeding, the user may still be allowed to select from the list already compiled.

Once the user selects an available printer from the presented list, the installation tool performs a check 238 to see whether the SNMP Community string of the selected device is the default value. If the SNMP community string is not the default value, the user will be presented with a dialog 240 so that the user can enter the correct string for the selected device or return to the dialog 236. If the SNMP community string is incorrect the user will again be prompted to enter the correct SNMP Community string.

Once the disclosed installation tool has verified that the correct SNMP community string has been entered, the user may be presented with an advanced printer configuration dialog 242. The dialog 242 allows the entry of an IP address for the printer, a subnet mask identifier, and a default gateway. These entries may be made automatically via DHCP or the values may be specified manually. Specifying either an invalid address or an address already being used will preferably result in an error message where the user will be prompted to enter correct values. Otherwise, a printer configuration dialog 244 will appear.

The dialog 244 allows the user to name the device and optionally provide a location description. A default name may be initially displayed in the dialog 244. The default name that is displayed should be the device name retrieved from the printer, and is preferably limited to 15 characters and follows the DNS naming convention (no spaces, no special characters). The user can change this name so long as it follows the aforementioned length limitations. This name and location string is written back to the printer using SNMP or CMIP and the printer will register this name with the WINS/DNS server. Once the printer has been configured the user may be presented with a dialog 246 in which the printer may be named by the user.

The dialog 246 may be presented in a user interface similar to that shown in FIG. 17. The dialog 246 allows the user to give a Windows name of the printer. The default will be the name of the printer in the installed machine. Using this window, a user preferably has the option of giving the printer an intuitive name by which the user may subsequently recognize that particular printer when sending it a print job so that the user can locate the printer and easily retrieve the completed print job. The dialog 246 may also preferably allow the user to select the printer as the default windows computer for local print jobs.

Once the printer has been configured and named in the dialogs 244 and 246, respectively, the installation tool may request the driver location as illustrated in FIG. 16, the installation tool may select the print type as illustrated in FIG. 11B, and the installation tool may present the dialog 248 in which the user may elect to share the printer with other network computers. If the printer is to be shared, the user should preferably give a share name the operating system of all the computers printing to the selected printer. If the printer is shared, a dialog (not shown) may be displayed so that the user has the option of installing the printer as a peer-to-peer, i.e. connected directly to a network or as a network printer, i.e. connected to a network server through another network computer.

Once the user has configured and named the selected printer, and indicated whether or not the printer is to be shared, the disclosed installation tool may push the configuration parameters back to the host computer/server using SNMP protocols and updating the printer's DNS name. This step may not be necessary if no values have changed, i.e. the default values were selected. If, however, any value has been changed, the installation tool will preferably check whether the printer started using the new values pushed to the printer. If the printer is not started using the new values, the installation tool may reset 250 the printer and verify the printer on resetting starts using the new values.

Once the printer has been verified to use the new parameters, the installation tool may creates a new LPR port and add registry entries, install the Printer driver on to the newly created port, and prompt the user to print a test page, send the test printer data to the printer. The user may then be presented with a last install dialog 252 and the installation tool will then terminate.

All references disclosed herein are incorporated by reference.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

The invention claimed is:

1. A printer installation tool for installing and configuring a printer on a computer or a network of computers, installation of said printer including (i) configuring said printer by associating a unique name and unique location of said printer relative to other printers installed on said network, and (ii) associating a driver with said printer, said installation tool comprising:
    (a) a search tool for discovering uninstalled printers available for installation on said computer or network of computers;
    (b) a display for displaying to a user a list of available uninstalled printers for installation, said display allowing said user to select one or more said uninstalled printers to be installed;
    (c) a configuration tool for configuring the selected said one or more printers, said configuration tool being capable of receiving a unique, arbitrary user-selected alphanumeric name for each one of the selected said one or more printers and associating said name with said printer on said computer or network of computers;
    (d) a filter for categorizing the discovered printers available for installation into a plurality of categories and wherein at least two of said plurality of categories are hierarchically arranged with respect to each other, and where said display is capable of selectively displaying selected ones of said categories of printers while not displaying ones of categories of printers not selected; and
    (e) a driver setup tool for associating a printer driver with each of the selected said one or more printers to be installed in response to the user selecting said one or more printers from a displayed said filtered list.

2. The printer installation tool of claim 1 where said configuration tool may simultaneously configure a plurality of printers selected by said user from said display.

3. The printer installation tool of claim 1 where said selected one or more printers is connected to a computer connected to a network server, and said configuration tool configures said selected one or more printers, said computer, and said server.

4. The printer installation tool of claim 1 wherein said configuration tool is capable of automatically configuring said selected one or more printers.

5. The printer installation tool of claim 1 where said search tool is limited to discovering printers and where said filter categorizes discovered said printers into the nonexclusive categories of those printers that have not been previously discovered by said installation tool, those printers that have not been previously configured by said installation tool, and all discovered devices.

6. The printer installation tool of claim 1 where said configuration tool is capable of receiving an intuitive location description for each of said selected one or more printers and associating said location description with said printer on said computer or network of computers.

7. The printer installation tool of claim 1 where said computer operates on a Windows NT 4.0 operating system.

8. The printer installation tool of claim 1 where said computer operates on a Windows 2000 operating system.

9. The printer installation tool of claim 1 where said computer operated on a Windows XP operating system.

10. The printer installation tool of claim 1 where said installation tool is capable of installing and configuring a printer on any one of a plurality of operating systems.

11. The printer installation tool of claim 10 where said plurality of operating systems include Windows 9x, Windows NT 4.0, Windows 2000, and Windows XP.

12. A method for installing and configuring a printer on a computer or a network of computers, installation of said printer including (i) configuring said printer by associating a unique name and unique location of said printer relative to other printers installed on said network, and (ii) associating a driver with said printer, said method comprising:
  (a) searching for uninstalled printers available for installation on said computer or network of computers;
  (b) displaying to a user a list of available said uninstalled printers for installation, where said user may select one or more said uninstalled printers to be installed;
  (c) receiving a unique, arbitrary user-selected alphanumeric name for each one of the selected said one or more printers;
  (d) associating said name with said printer on said computer or network of computers;
  (e) filtering the discovered printers available for installation into hierarchically arranged categories, and the step of displaying selectively displays one of said categories of printers while not displaying ones of categories of printers not selected; and
  (f) associating a printer driver with each of the selected said one or more printers to be installed in response to the user selecting said one or more printers from a displayed said filtered list.

13. The method of claim 12 where said method simultaneously configures a plurality of printers selected by said user.

14. The method of claim 12 where said selected one or more printers is connected to a computer connected to a network server, and said method configures said selected one or more printers, said computer, and said server.

15. The method of claim 12 where said method is capable of automatically configuring said selected one or more printers.

16. The method of claim 12 where said categories are nonexclusive and include those printers that have not been previously discovered by said installation tool, those printers that have not been previously configured by said installation tool, and all discovered devices.

17. The method of claim 16 including the step of receiving an intuitive location description for each of said selected one or more printers and associating said location description with said printer on said computer or network of computers.

18. The method of claim 12 where said computer operates on a Windows 9x operating system.

19. The method of claim 12 where said computer operates on a Windows 2000 operating system.

20. The method of claim 12 where said computer operates on a Windows XP operating system.

21. The method of claim 12 where said installation tool is capable of installing and configuring a printer on any one of a plurality of operating systems.

22. The method of claim 21 wherein said plurality of operating systems include Windows 9x, Windows NT 4.0, Windows 2000, and Windows XP.

23. A printer installation tool for installing and configuring a printer on a computer or a network of computers, installation of said printer including (i) configuring said printer by associating a unique name and unique location of said printer relative to other printers installed on said network, and (ii) associating a driver with said printer, said installation tool comprising:
  (a) a search tool for discovering uninstalled printers available for installation on said computer or network of computers;
  (b) a display for displaying to a user a list of available uninstalled printers for installation, said display allowing said user to select one or more said uninstalled printers to be installed;
  (c) a configuration tool for configuring the selected said one or more printers, said configuration tool being capable of receiving a unique, arbitrary user-selected alphanumeric name for each one of the selected said one or more printers and associating said name with said printer on said computer or network of computers;
  (d) a filter for categorizing the discovered printers available for installation into a plurality of categories, and where said display is capable of selectively displaying selected ones of said categories of printers while not displaying ones of categories of printers not selected; and
  (e) a driver setup tool for associating a printer driver with each of the selected said one or more printers to be installed in response to the user selecting said one or more printers from a displayed said filtered list.

24. The printer installation tool of claim 23 where said configuration tool may simultaneously configure a plurality of printers selected by said user from said display.

25. The printer installation tool of claim 23 where said selected one or more printers is connected to a computer connected to a network server, and said configuration tool configures said selected one or more printers, said computer, and said server.

26. The printer installation tool of claim 23 wherein said configuration tool is capable of automatically configuring said selected one or more printers.

27. The printer installation tool of claim 23 where said filter categorizes said discovered printers into the nonexclusive categories of those printers that have not been previously discovered by said installation tool, those printers that have not been previously configured by said installation tool, and all discovered devices.

28. The printer installation tool of claim 23 where said configuration tool is capable of receiving an intuitive location description for each of said selected one or more printers and associating said location description with said printer on said computer or network of computers.

29. The printer installation tool of claim 23 where said computer operates on a Windows NT 4.0 operating system.

30. The printer installation tool of claim 1 where said computer operates on a Windows 2000 operating system.

31. The printer installation tool of claim 23 where said computer operated on a Windows XP operating system.

32. The printer installation tool of claim 23 where said installation tool is capable of installing and configuring a printer on any one of a plurality of operating systems.

33. The printer installation tool of claim 32 where said plurality of operating systems include Windows 9x, Windows NT 4.0, Windows 2000, and Windows XP.

34. A method for installing and configuring a printer on a computer or a network of computers, installation of said printer including (i) configuring said printer by associating a unique name and unique location of said printer relative to other printers installed on said network, and (ii) associating a driver with said printer, said method comprising:
  (a) searching for uninstalled printers available for installation on said computer or network of computers;

(b) displaying to a user a list of available said uninstalled printers for installation, where said user may select one or more said uninstalled printers to be installed;

(c) receiving a unique, arbitrary user-selected alphanumeric name for each one of the selected said one or more printers;

(d) associating said name with said printer on said computer or network of computers;

(e) filtering the discovered printers available for installation into categories, and the step of displaying selectively displays one of said categories of printers; and (f) associating a printer driver with each of the selected said one or more printers to be installed in response to the user selecting said one or more printers from a displayed said filtered list.

35. The method of claim 34 where said method simultaneously configures a plurality of printers selected by said user.

36. The method of claim 34 where said selected one or more printers is connected to a computer connected to a network server, and said method configures said selected one or more printers, said computer, and said server.

37. The method of claim 34 where said method is capable of automatically configuring said selected one or more printers.

38. The method of claim 34 where said categories are nonexclusive and include those printers that have not been previously discovered by said installation took, those printers that have not been previously configured by said installation tool, and all discovered devices.

39. The method of claim 38 including the step of receiving an intuitive location description for each of said selected one or more printers and associating said location description with said printer on said computer or network of computers.

40. The method of claim 34 where said computer operates on a Windows 9x operating system.

41. The method of claim 34 where said computer operates on a Windows 2000 operating system.

42. The method of claim 34 where said computer operates on a Windows XP operating system.

43. The method of claim 34 where said installation tool is capable of installing and configuring a printer on any one of a plurality of operating systems.

44. The method of claim 43 wherein said plurality of operating systems include Windows 9x, Windows NT 4.0, Windows 2000, and Windows XP.

\* \* \* \* \*